(12) United States Patent
Gopalakrishnan et al.

(10) Patent No.: US 10,219,022 B1
(45) Date of Patent: Feb. 26, 2019

(54) METHOD AND SYSTEM FOR SHARING TELEVISION (TV) PROGRAM INFORMATION BETWEEN SET-TOP-BOXES (STBS)

(71) Applicant: Wipro Limited, Bangalore (IN)

(72) Inventors: Krishnanunni Gopalakrishnan, Cochin (IN); Abbin Paul, Nellimattom (IN); Ajin Alias Mammoottil, Kochi (IN); Abdul Salam Thayyil Azeez, Alappuzha (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/942,501

(22) Filed: Mar. 31, 2018

(30) Foreign Application Priority Data

Feb. 16, 2018 (IN) .............................. 201841005941

(51) Int. Cl.
*H04N 21/4227* (2011.01)
*H04M 1/725* (2006.01)
*G10L 13/06* (2013.01)
*H04N 21/41* (2011.01)
*H04N 21/422* (2011.01)
*H04N 21/40* (2011.01)

(52) U.S. Cl.
CPC ......... *H04N 21/4227* (2013.01); *G10L 13/06* (2013.01); *H04M 1/72522* (2013.01); *H04N 21/40* (2013.01); *H04N 21/41* (2013.01); *H04N 21/4108* (2013.01); *H04N 21/4126* (2013.01); *H04N 21/4135* (2013.01); *H04N 21/42204* (2013.01); *H04N 21/42207* (2013.01); *H04N 21/42219* (2013.01); *H04N 21/42227* (2013.01); *H04N 21/42228* (2013.01)

(58) Field of Classification Search
None
See application file for complete search history.

(56) References Cited

U.S. PATENT DOCUMENTS

| 6,510,152 | B1 | 1/2003 | Gerszberg et al. |
| 9,462,332 | B2 | 10/2016 | Malik et al. |
| 9,628,286 | B1 | 4/2017 | Nguyen et al. |
| 2009/0307740 | A1* | 12/2009 | Keidar ................. H04H 20/426 725/118 |
| 2010/0064335 | A1 | 3/2010 | Jenkin et al. |
| 2011/0023074 | A1* | 1/2011 | Nguyen ................. H04N 17/00 725/110 |

(Continued)

*Primary Examiner* — Justin E Shepard
(74) *Attorney, Agent, or Firm* — LeClairRyan PLLC

(57) ABSTRACT

This technology relates generally to television set-top-boxes (STBs), and more particularly to sharing program information between STBs using voice communication. In one embodiment, a method of sharing television (TV) program information between STBs is disclosed. The method includes obtaining, by a control unit, program-specific-information of TV content selected by a first user using a first STB. The program-specific-information may be converted into a voice message by a Text-to-Speech (TTS) converter. The method further includes establishing, using a first Subscriber Identity Module (SIM) associated with the first STB, a voice call from the first STB to a second STB. The voice message associated with the program-specific-information may be transmitted from the first SIM to a second SIM associated with the second STB over the voice call using a first modulation scheme.

12 Claims, 5 Drawing Sheets

(56) References Cited

U.S. PATENT DOCUMENTS

| | | | |
|---|---|---|---|
| 2011/0041153 A1* | 2/2011 | Simon | G06Q 30/02 725/46 |
| 2014/0273974 A1* | 9/2014 | Varghese | H04M 3/42246 455/412.1 |
| 2015/0222444 A1 | 8/2015 | Sarkar | |
| 2016/0140952 A1* | 5/2016 | Graham | G10L 13/033 704/260 |
| 2018/0075564 A1* | 3/2018 | Jeong | G06Q 30/06 |

* cited by examiner

US 10,219,022 B1

METHOD AND SYSTEM FOR SHARING TELEVISION (TV) PROGRAM INFORMATION BETWEEN SET-TOP-BOXES (STBS)

This application claims the benefit of Indian Patent Application Serial No. 201841005941, filed Feb. 16, 2018, which is hereby incorporated by reference in its entirety.

FIELD

This disclosure relates generally to television set-top-boxes (STBs), and more particularly to sharing television (TV) program information between STBs using voice communication.

BACKGROUND

Set-top-boxes (STBs) are electronic devices that are connected to or incorporated within televisions (TVs). STBs may receive a broadcast signal from the content provider and transform the broadcast signal into video signal that can be displayed on the TV. For instance, STBs are capable of delivering live TV service, video-on-demand (VOD) service, pay-per-view (PPV) services, and the like, through cable line, antenna or satellite. Further, STBs are equipped with built-in digital video recorder (DVR) and/or Personal Video Recorder (PVR) capabilities that allow a user to record TV content and watch them later.

TV viewing is largely confined to an individual experience, whereby a STB allows the user to view and/or record a TV program in accordance with the individual user's preference. Some example technologies allow users to recommend TV programs to other users. A user may recommend a particular TV program by sharing the program information by messaging or calling other users using cell phones, computers, or the like. However, for messaging, the user needs to type in program-specific-information such as service name, event name, event time, and event description in order to adequately inform the recipient. The user may also share the TV program by first recording it in the TV's memory or in the memory of a STB associated with the TV, and then uploading/sending the same via the Internet. Such ways of sharing TV program information consume time and may also cause diversion or disruption for the user in watching an ongoing program.

SUMMARY

In one embodiment, a method of sharing TV program information between STBs is disclosed. The method may include obtaining, by a control unit, program-specific-information of TV content selected by a first user using a first STB. The program-specific-information may be converted into a voice message by a Text-to-Speech (TTS) converter. The method further includes establishing, using a first Subscriber Identity Module (SIM) associated with the first STB, a voice call from the first STB to a second STB. The voice message associated with the program-specific-information may be transmitted from the first SIM to a second SIM associated with the second STB over the voice call using a first modulation scheme.

In one embodiment, a transmitter-side set-top-box (STB) is disclosed. In one example, the transmitter-side STB may include a control unit, a TTS converter, and a first SIM. The control unit may obtain program-specific-information of TV content selected by a first user and generate an initiate command to share the program-specific-information with a receiver-side STB. The TTS converter may convert the program-specific-information into a voice message based on the initiate command. The first SIM may transmit the voice message associated with the program-specific-information to a second SIM associated with the receiver-side STB over a voice call using a first modulation scheme.

In one embodiment, a non-transitory computer-readable medium storing computer-executable instructions for sharing TV program information between STBs is disclosed. In one example, the stored instructions, when executed by a processor, may cause the processor to perform operations including obtaining program-specific-information of TV content selected by a first user. The operations may further include generating an initiate command to share the program-specific-information with a receiver-side STB. The operations may further include instructing a TTS module to convert the program-specific-information into a voice message based on the initiate command. The operations may further include instructing a first SIM to transmit the voice message associated with the program-specific-information to a second SIM associated with the receiver-side STB, over a voice call, using a first modulation scheme.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Exemplary embodiments illustrate a system and a method of sharing program-specific-information (i.e., TV program information) between STBs. In an exemplary embodiment, a first user may select TV content that the user wishes to share with other users. The TV content may include a TV program that is currently broadcast. The TV content may also include TV programs that are scheduled to be broadcast in the future. The term "TV content" and "TV program" can be used interchangeably throughout the document. The user may select a TV program to be shared with one or more second users from the Electronic Program Guide (EPG). An EPG is an application used with digital STBs and smart television sets to list current and scheduled programs that are or will be available on each channel and a short summary or commentary for each program. Information related to the selected program may be aggregated, for example, in a first STB (i.e., transmitter-side STB) and directly sent to the second STB (i.e., receiver-side STB) through a voice call. Also the TV program selection may be done by pressing a remote key (i.e., of remote control unit (RCU)), so that currently watched program information may be shared by the first user to the second user. The voice call may be transmitted over a voice communication network such as, but not limited to, a Global System for Mobile (GSM) network. A user associated with the first STB may thus share TV program information with a user of the second STB.

Figure 1:
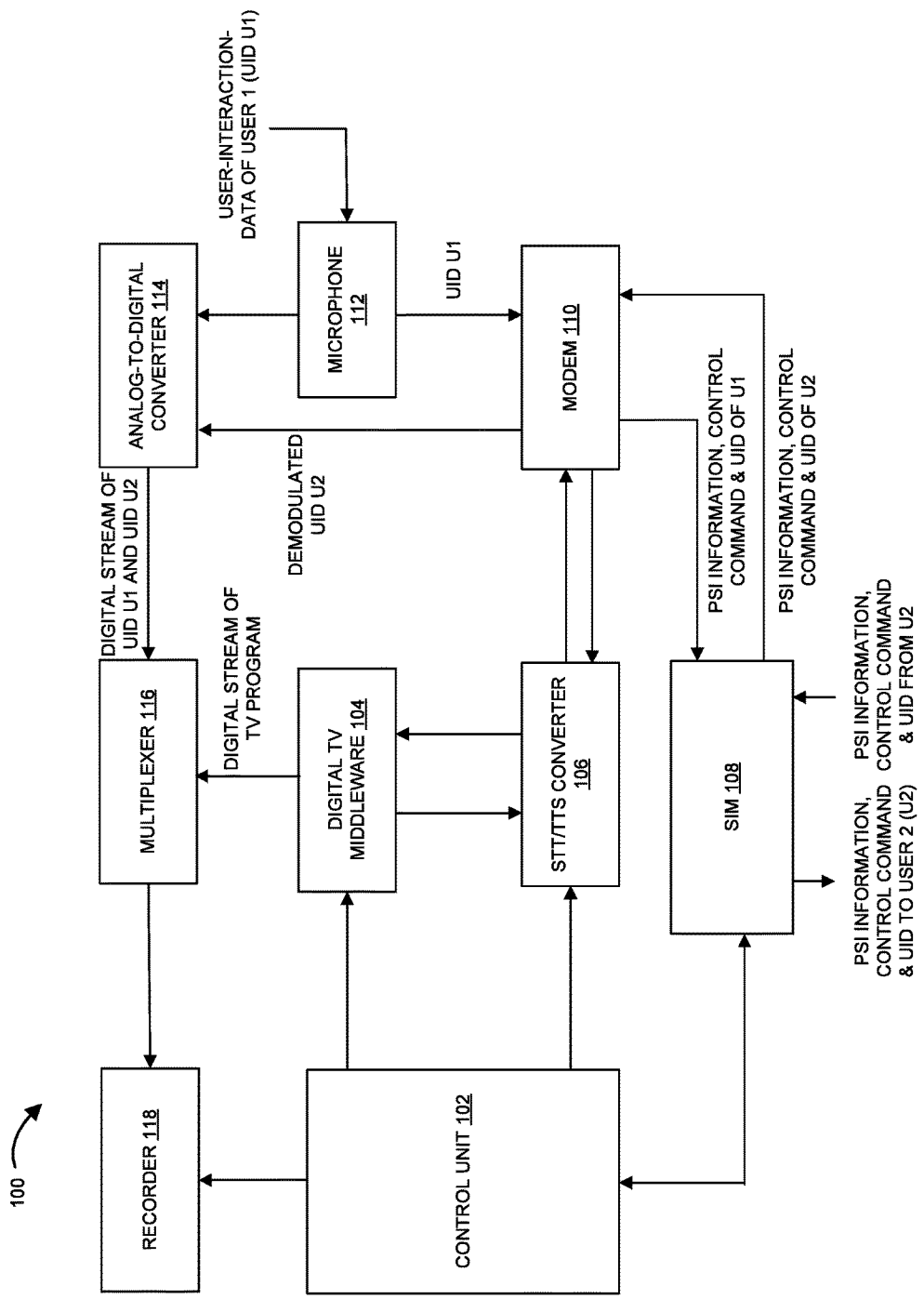
FIG. 1 is a functional block diagram for a transmitter-side Set-Top Box (STB) according to an exemplary embodiment of the present disclosure.

FIG. 1 is a functional block diagram of a transmitter-side STB 100 according to an exemplary embodiment of the present disclosure. The transmitter-side STB 100 may include a control unit 102, digital TV middleware 104, a Text-to-Speech (TTS)/Speech-to-Text (STT) converter 106, and a first Subscriber Identity Module (SIM) 108. The control unit 102 may be communicatively connected to the digital TV middleware 104, TTS/STT converter 106 and the first SIM 108 for sharing the TV program information.

During operation, the control unit 102 may obtain program-specific-information (i.e., PSI) of a TV program selected by a user U1 (not shown in FIG. 1). Here, the user U1 may select one or more TV programs (e.g., a currently scheduled program and a future scheduled program) to share with a user U2. On selection of the one or more TV programs by the user U1, the digital TV middleware 104 may provide program-specific-information of the selected TV programs to the control unit 102. The program-specific-information may include metadata associated with the TV program such as, but not limited to, title of the program, channel identifiers, actors associated with the program, genre, guests, episode number, first run/rerun time, recording schedules, settings, and the time slot and duration of the TV program etc.

The control unit 102 may then generate an initiate command to share the program-specific-information with a receiver-side STB. Upon receiving the initiate command, TTS/STT converter 106 may convert the program-specific-information into a voice message. The voice message associated with the PSI may be a recommendation message containing relevant information such as the recommended TV program, the service in which the TV program will be broadcasted, and the time slot and duration of the TV program. Herein, "voice message", "PSI-based voice message", "voice message associated with PSI" and "recommendation message" may be used interchangeably without deviating from the scope of the present disclosure.

In order to transmit the voice message associated with the PSI, MODEM 110 may modulate the voice message associated with the PSI using a first modulation scheme. The modulated voice message may then be directly transmitted using the first SIM 108 to the receiver-side STB over a voice call initiated between the first SIM 108 and a second SIM associated with the receiver-side STB. Directly transmitting the voice message associated with the PSI between the transmitter-side STB and the receiver-side STB is explained further in conjunction with FIG. 3A. Used herein, the SIM card 108 may refer to an integrated circuit (IC) built-in card mounted onto a SIM card connector disposed in the transmitter-side STB 100. The SIM card 108 may enable GSM voice communication (e.g., a full-duplex voice communication) with the receiver-side STB, which is selected from a pre-configured contact list stored in the first SIM 108.

Once the voice message associated with the PSI is transmitted to the receiver-side STB over the voice call, the receiver-side STB may demodulate the voice call to extract the TV program information (i.e., PSI) from voice message (i.e., recommendation message). In some embodiments, on receiving the recommendation message, the receiver-side STB may automatically tune or switch to the recommended program. In some other embodiments, the recommended program may be displayed as a pop-up message to a user (user U2) of the receiver-side STB. The pop-up message may provide user U2 with options to switch to the recommended TV program, to view the recommended program at a later time, or to discard the recommended TV program.

In some embodiments, the voice call may be established from the transmitter-side STB 100 to a mobile device of the user U2. In this case, the user U2 may be provided with options to switch to the recommended TV program, to view the recommended program at a later time, or to discard the recommended TV program on the mobile device of user U2. The user U2 may select an option on the mobile device and subsequently the voice call may be forwarded to the receiver-side STB through the mobile device. When the voice call is forwarded to the receiver-side STB, the voice call may be demodulated and the selected option by the user U2 may be implemented. This is explained in detail in conjunction with FIG. 3B of the description.

Having received the recommended message at the receiver-side STB, the user U2 may watch the same TV program as recommended by the user U1. Further, during viewing of the TV program, user U1 and user U2 may interact with each other over the established voice call. Both users may provide audio/voice comments related to the recommended program through a microphone 112. The comments provided by the users U1 and U2 may be captured as user-interaction-data. The user-interaction-data may be modulated using a second modulation scheme by the MODEM 110. The second modulation scheme for modulating the user-interaction-data may be different from the first modulation scheme for modulating the recommendation message. Thereby, over the same voice call, the first SIM 108 may transmit the user-interaction-data and recommendation message at different modulation frequencies on a RF carrier.

Once the user-interaction-data of user U1 is transmitted over the voice call, the receiver-side STB may demodulate the user-interaction-data which is then communicated to the user U2 through any audio output unit (e.g., speaker, headset, etc). In the same way, the user-interaction-data of user U2 may be transmitted over the voice call from the receiver-side STB to the transmitter-side STB 100. In some embodiments, the user-interaction-data may be converted to text and displayed on the TV of user U1 and user U2. Further, the TV program (i.e., TV content) along with the user-interaction-data (i.e., UID U1 and U2 as in FIG. 1) may be recorded at the transmitter-side STB 100. For recording, the user-interaction-data may be initially converted into a digital stream by an analog-to-digital converter 114. The converted digital stream of user-interaction-data may be multiplexed with the digital stream associated with the TV program content by a multiplexer 116 and then the multiplexed digital stream may be recorded by a recorder 118.

Further, on selection of a control command (i.e., STB-directed command) by the user U1, the display of TV program may be controlled in a synchronized manner at both the transmitter-side STB 100 and the receiver-side STB. "Control command" and "STB-directed command" may be used interchangeably throughout the document. Example STB-directed commands may include but not limited to pause, rewind, instant replay, skip back, fast forward, skip ahead, play, and stop. In one example, the STB-directed commands provided by the user U1 (i.e., using the remote control unit (RCU)) may be converted into audio signal by TTS/STT converter. The audio signal indicating STB-directed commands may then transmitted to the receiver-side STB, over the voice call, using a third modulation scheme. Noted herein, the third modulation scheme for modulating the control commands (i.e., STB-directed commands) may be different from the first modulation scheme for modulating the recommendation message and the second modulation scheme for modulating the user-interaction-data.

In one example, the STB-directed command and the user-interaction-data may be provided to an annotator that is configured to associate the STB-directed command and the user-interaction-data with a location (e.g., play-time reference) in the TV program where they were given by users. Upon annotation, the voice message associated with PSI along with the STB-directed command and the user-interaction-data may be multiplexed and then transmitted to the receiver-side STB.

In one exemplary embodiment, the control unit 102 may generate a first handshake command to ensure that the appropriate demodulation of the recommendation message (i.e., voice message associated with PSI), user-interaction-data, and STB-directed commands with the receiver-side STB is performed. Furthermore, a second handshake command may be provided from the transmitter-side STB 100 to the receiver-side STB to cease the voice call between the transmitter-side STB 100 and the receiver-side STB. The second handshake signal may be provided either automatically after completion of the TV program or manually provided at any time while watching the TV program by the users (U1 or U2).

Figure 2:
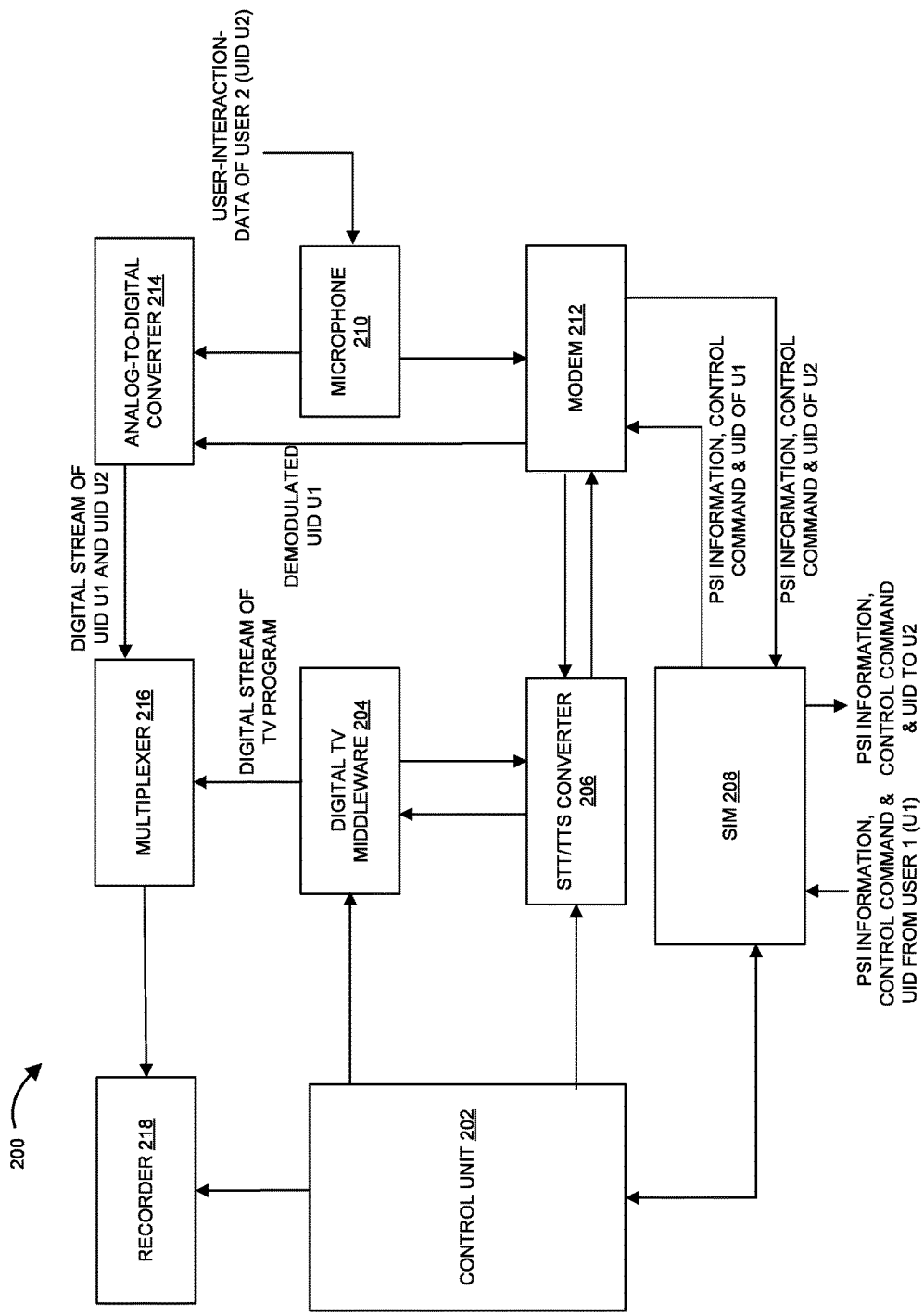
FIG. 2 is a functional block diagram for a receiver-side STB according to an exemplary embodiment of the present disclosure.

FIG. 2 is a functional block diagram of a receiver-side STB 200 which may be remotely controlled based on the voice call from the transmitter-side STB 100 (as shown in FIG. 1). Over the voice call, a second SIM 208 may receive the voice message associated with PSI (i.e., recommendation message) from the transmitter-side STB. To extract the program-specific-information, control unit 202 may instantiate various modules such as digital TV middleware 204, Speech-to-Text (STT)/Text-to-Speech (TTS) converter 206, and MODEM 212. Upon instantiation, the MODEM 212 may demodulate the voice message associated with PSI received in the first modulation scheme, and then the demodulated voice message may be converted into associated program-specific-information by the STT/TTS converter 206.

Using the extracted program-specific-information, the TV program associated with the voice message may be automatically presented by the digital TV middleware 204 to the user U2 associated with the receiver-side STB 200. Further, the user-interaction-data of the first user received in the second modulation scheme may be demodulated using the MODEM 212 and then communicated to the second user through any audio output unit (e.g., speaker, headset, etc).

Receiver-side STB 200 may have similar calling functionalities, recording functionalities and capabilities as that of the transmitter-side STB. Therefore, at the receiver-side STB, digital TV middleware 204, STT/TTS converter 206, MODEM 212, microphone 210, A/D converter 214, multiplexer 216, and recorder 216 may perform operations such as sending a voice message associated with PSI of another TV program which is different from the recommended TV program by user U1, sending control commands (i.e., STB-directed commands), receiving audio-commentaries from the users U1 and U2, converting the audio-commentaries into digital stream and then recording the TV program along with the audio-commentaries of users (U1 and U2), respectively, in a similar way as described in the transmitter-side STB 100 of FIG. 1.

In particular, as will be appreciated by those of ordinary skill in the art, control unit, digital TV middleware, TTS/STT converter, A/D converter, multiplexer and/or other components for performing the techniques and steps described herein may be implemented by the STB, either by hardware, software, or combinations of hardware and software. For example, suitable code may be accessed and executed by the one or more processors on the STB to perform some or all of the techniques described herein. Similarly application specific integrated circuits (ASICs) configured to perform some or all of the processes described herein may be included in the one or more processors on the STB.

Figure 3A:
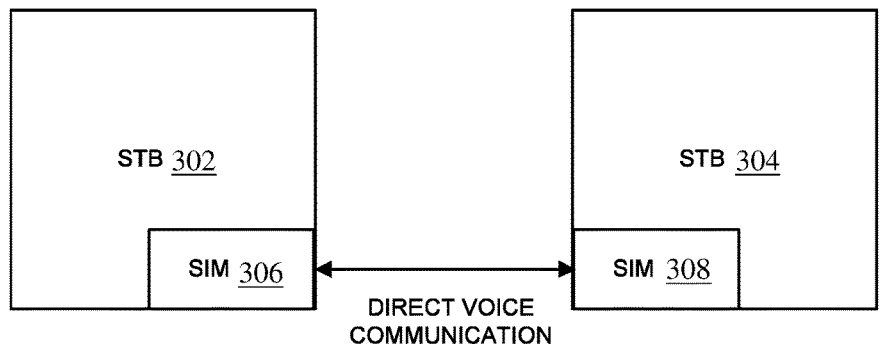
FIG. 3A illustrates a system for sharing program information between STBs using voice communication, according to an exemplary embodiment of the present disclosure.

FIG. 3A illustrates a system for sharing program information between STBs 302 and 304 using voice communication. As shown, two STBs 302 and 304 located remotely may include SIMs 306 and 308 respectively to communicate with each other through a network. Consider a user U1 of STB 302 selects a sport channel broadcasting a live cricket match to share with STB 304 which is currently switched ON. In this case, sharing program information between STBs 302 and 304 may be performed by the following operations: the program-specific-information of the selected live cricket match may be obtained at the STB 302. The program-specific-information may include channel identifier—star sports; program title—ICC U-19 cricket world cup 2018 final; team—India vs Australia; and language—English. The program-specific-information of the live cricket match may be converted into a voice-based recommendation message.

A voice call may be established from the STB 302 to STB 304, using the SIM 306, to transmit the voice-based recommendation message to STB 304. In one example, upon receiving the recommendation message over the voice call, STB 304 may automatically tune or switch to the recommended program without asking for user U2 confirmation. In another example, upon receiving the recommendation message over the voice call, a pop up message (e.g., "view the recommendation?" along with relevant options "Yes" and "No") may be displayed on TV to confirm if the user U2 wants to view the recommended sport channel. If user selects "No" option in the pop message, the recommendation message may be discarded or may be marked read for future viewing. If user selects "Yes" option in the pop message, the STB 304 may be switched to the same TV channel (i.e., star sports) as that of STB 302 using the program-specific-information in the recommendation message.

While watching the TV program, users U1 and U2 may talk and interact with each other by sharing game commentaries (i.e., user-interaction-data) about the cricket match, over the same voice call established between the STB 302 and 304. Further, users U1 and U2 may provide control commands (e.g., pause, volume increase, and the like) at their respective STBs 302 and 304. The control commands may be multiplexed along with recommendation message and game commentaries, which may be then shared from one STB (e.g., 302) to other STB (e.g., 304) such that display of cricket match may be controlled in a synchronized manner at both the STBs 302 and 304. Upon a user request, the game commentaries and the cricket match are multiplexed and recorded for future playback. The recorded content may be stored in STB 302, STB 304, or any central storage.

Figure 3B:
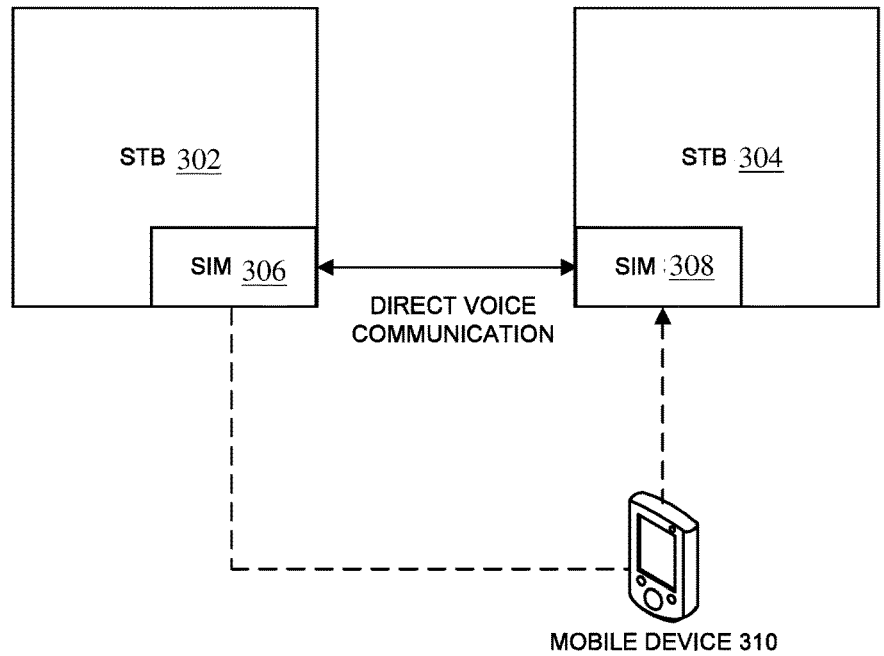
FIG. 3B illustrates a system for sharing program information between STBs via a mobile device using voice communication, according to another exemplary embodiment of the present disclosure.

FIG. 3B illustrates another exemplary system for sharing program information between the STBs 302 and 304 via a mobile device 310. In this case, user U1 of STB 302 watching the live cricket match may trigger a voice call from STB 302 to the mobile device 310 of user U2. Initially, a handshake command is transmitted over the voice call, to indicate the mobile device 310 that the received voice call is uniquely for sharing the recommendation message associated with a TV program. Upon receiving the recommendation message over the voice call, a pop up message (e.g., "Forward the call to STB 304?" along with relevant options "Yes" and "No") may be displayed on the mobile device 310 to confirm if the user U2 wants to forward the voice call to STB 304 to view the recommended sport channel. Upon forwarding the call, the direct communication may be established between the STB 302 and STB 304 and then STB 302 may initiate the necessary steps that are similar to the steps as explained with respect to FIG. 3A.

In another exemplary embodiment, the future-scheduled TV program may be selected by the user, and then the schedules may be shared and synchronized between both STBs so that the users at both ends may watch the future-scheduled TV program together. Thus, STBs with GSM SIMs may enable automatic management of one STB using another STB over the voice call without user intervention. Further, STBs with GSM SIMs may enable cooperative processing and information sharing between STBs so that the currently-scheduled or future-scheduled TV program may be viewed as a synchronized content by remotely located users. Further, without requiring a central server, the transfer of recommendation message (i.e., voice message associated with PSI), user-interaction-data, and the STB-directed commands between the STBs may be specifically realized through a direct dialing of a voice call from one STB to another STB. In this case, the voice message associated with PSI and the STB-directed commands are converted into respective audio/voice signals which are then transmitted over the voice call. Though the examples are described with respect to two STBs, the TV program information may be shared from one STB to multiple STBs.

Figure 4:
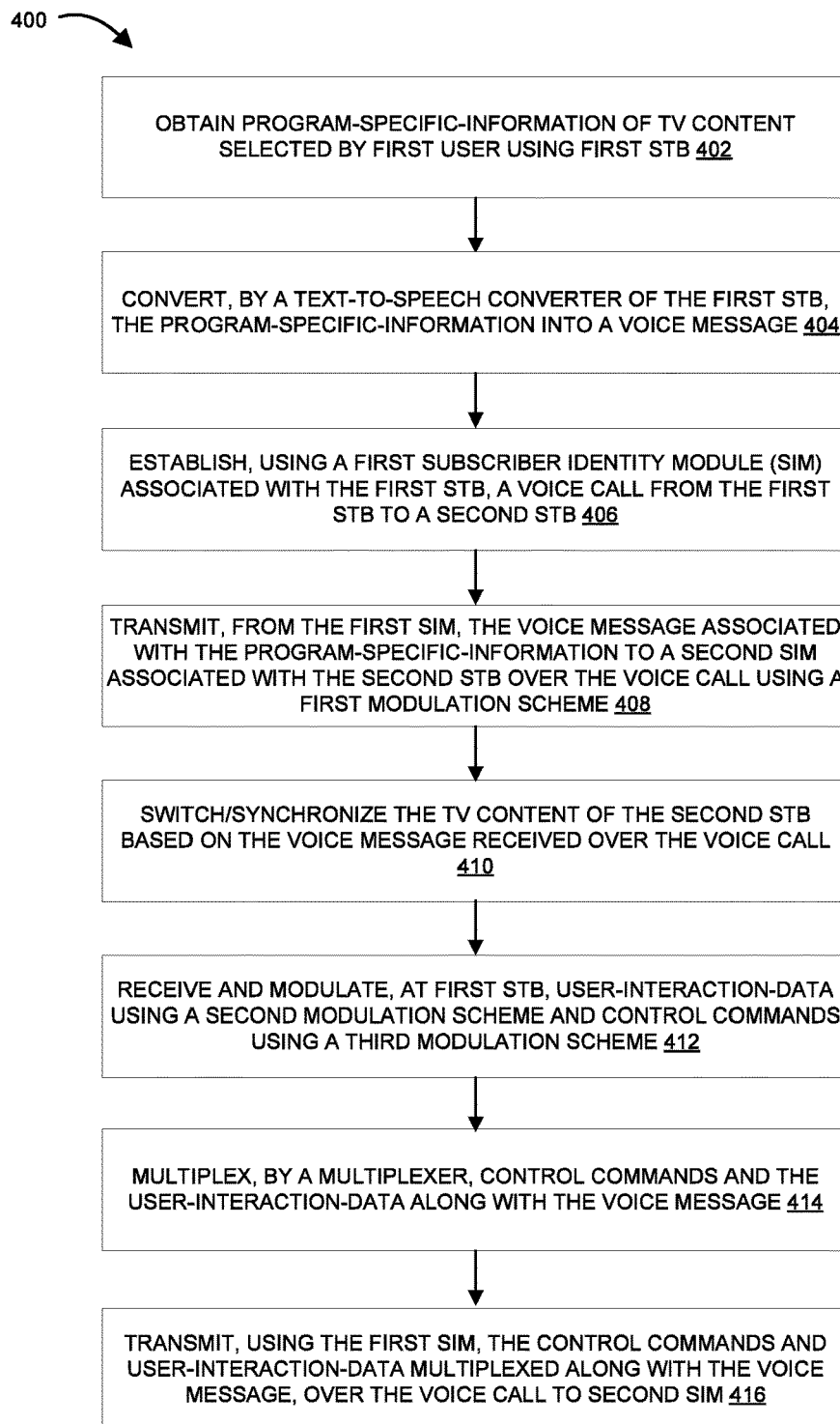
FIG. 4 is a flow diagram illustrating steps performed at a transmitter-side STB to share program information with a receiver-side STB using voice communication, in accordance with an exemplary embodiment of the present disclosure.

Referring now to FIG. 4, is a flow diagram illustrating steps performed at a transmitter-side STB (i.e., a first STB) to share program information with a receiver-side STB (i.e., a second STB) using voice communication. As illustrated in the flowchart, at step 402, the control unit of the first STB may obtain program-specific-information of TV content (i.e., TV program) selected by a first user. At step 404, a TTS/STT converter of the first STB may convert the program-specific-information into a voice message. The voice message associated with program-specific-information may be a recommendation message containing relevant information such as the recommended TV content, the service in which the TV content will be broadcasted, and the time slot and duration of the TV program. At step 406, using a first SIM associated with the first STB, a voice call may be established from the first STB to the second STB. At step 408, from the first SIM, the voice message associated with the program-specific-information may be transmitted to a second SIM associated with the second STB over the voice call using a first modulation scheme.

At step 410, switch/synchronize the TV content of the second STB based on the voice message associated with the program-specific-information received over the voice call from the first STB. At step 412, upon switching the second STB to the same TV program as that of the first STB, receive user-interaction-data and control commands at the first STB, and then modulate user-interaction-data using a second modulation scheme and control commands using a third modulation scheme. At step 414, the control commands and the user-interaction-data associated with the TV content may be multiplexed along with the voice message associated with the program-specific-information by a multiplexer. The user-interaction-data may be comments related to the recommended program provided by users. The control commands may include pause, rewind, instant replay, skip back, fast forward, skip ahead, play, stop, and the like. At step 416, upon multiplexing, the control commands, the user-interaction-data and the voice message associated with program-specific-information may be transmitted over the same voice call from the first STB to the second STB. In a similar way, the voice message associated with program-specific-information (i.e., TV program recommended by user U2 to user U1), user-interaction data, and the control commands may be shared from the second STB to the first STB.

Additional illustrative embodiments are listed below. In one embodiment, a non-transitory computer-readable medium storing computer-executable instructions for sharing TV program information between STBs is disclosed. In one example, the stored instructions, when executed by a processor, may cause the processor to perform operations including obtaining program-specific-information of TV content selected by a first user. The operations may further include generating a control command to share the program-specific-information with a receiver-side STB. The operations may further include instructing a TTS/STT module to convert the program-specific-information into a voice message based on the control command. The operations may further include instructing a first SIM to transmit the voice message associated with the program-specific-information to a second SIM associated with the receiver-side STB, over a voice call, using a first modulation scheme.

Computer System

Figure 5:
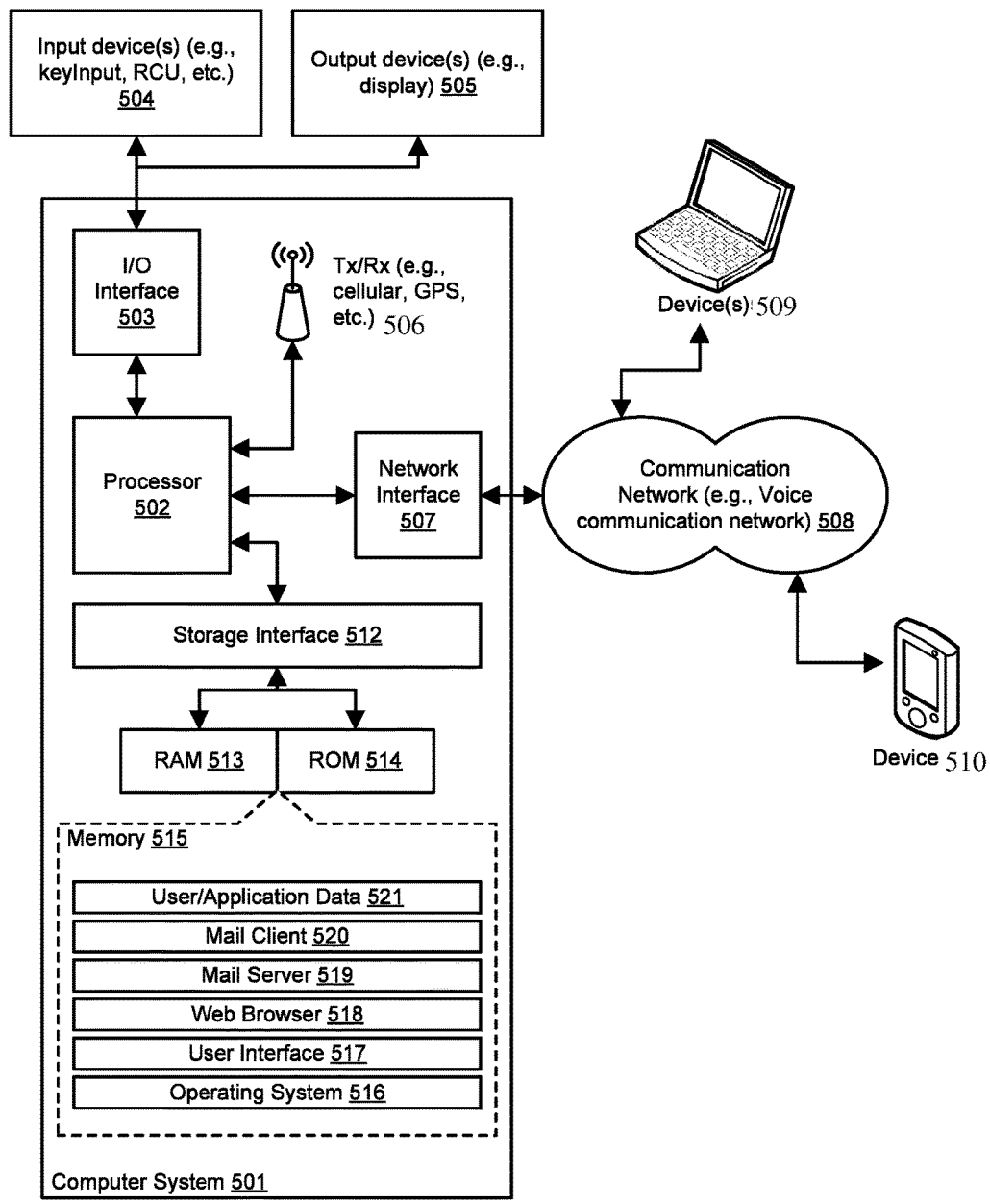
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be a transmitter-side STB that shares program information with a receiver-side STB using voice communication. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control unit 104s, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be (infrared) remote control, key-inputs, keyboard, microphone, touch screen, touchpad, sensor (e.g., accelerometer, light sensor, GPS, gyroscope, proximity sensor, or the like), visors, etc. Output device 505 may be a video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, GSM network and other similar network that provide voice communication such as a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., voice message/recommended message associated with the TV program, user-interaction-data associated with the TV program, and STB-directed commends associated with the TV program) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Object-Store, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of sharing television (TV) program information, the method implemented by one or more set-top-boxes (STBs) and comprising:
    obtaining program-specific-information of TV content;
    converting, by a Text-to-Speech (TTS) converter, the program-specific information into a voice message;
    establishing, using a first Subscriber Identity Module (SIM) a voice call to another STB;
    transmitting, from the first SIM, (i) the voice message associated with the program-specific-information to a second SIM associated with the another STB over the voice call using a first modulation scheme, (ii) user interaction-data over the voice call using a second modulation scheme and (iii) one or more control commands over the voice call using a third modulation scheme; and
    multiplexing the voice message associated with the program-specific information, control commands, and the user-interaction-data over the voice call.

2. The method of claim 1, wherein the another STB is remotely controlled based on the voice call.

3. The method of claim 1, further comprising recording the TV content along with the user-interaction-data.

4. The method of claim 1, further comprising transmitting a handshake signal to terminate the voice call.

5. A transmitter-side set-top box (STB) comprising memory comprising programmed instructions stored thereon and a processor configured to be capable of executing the stored programmed instructions to:
    obtain program-specific-information of television (TV) content;
    convert, by a Text-to-Speech (TTS) converter, the program-specific information into a voice message;
    establish, using a first Subscriber Identity Module (SIM) a voice call to another STB;
    transmit, from the first SIM, (i) the voice message associated with the program specific-information to a second SIM associated with the another STB over the voice call using a first modulation scheme, (ii) user interaction-data over the voice call using a second modulation scheme and (iii) one or more control commands over the voice call using a third modulation scheme; and
    multiplex the voice message associated with the program-specific information, control commands, and the user-interaction-data over the voice call.

6. The transmitter-side STB of claim 5, wherein the another STB is remotely controlled based on the voice call.

7. The transmitter-side STB of claim 5, wherein the processor is
    further configured to be capable of executing the stored programmed instructions to record the TV content along with the user-interaction-data.

8. The transmitter-side STB of claim 5, wherein the processor is further configured to be capable of executing the stored programmed instructions to transmit a handshake signal to terminate the voice call.

9. A non-transitory computer readable medium having stored thereon instructions for sharing television (TV) program information comprising executable code which when executed by one or more processors, causes the processors to:
    obtain program-specific-information of TV content;
    convert, by a Text-to-Speech (TTS) converter, the program-specific information into a voice message;
    establish, using a first Subscriber Identity Module (SIM) a voice call to another set-top box (STB);
    transmit, from the first SIM, (i) the voice message associated with the program specific-information to a second SIM associated with the another STB over the voice call using a first modulation scheme, (ii) user interaction-data over the voice call using a second modulation scheme, and (iii) one or more control commands over the voice call using a third modulation scheme; and
    multiplex the voice message associated with the program-specific information, control commands, and the user-interaction-data over the voice call.

10. The non-transitory computer readable medium of claim 9, wherein the another STB is remotely controlled based on the voice call.

11. The non-transitory computer readable medium of claim 9, wherein the executable code when executed by the processors further causes the processors to record the TV content along with the user-interaction-data.

12. The non-transitory computer readable medium of claim 9, wherein the executable code when executed by the processors further causes the processors to transmit a handshake signal to terminate the voice call.

* * * * *